United States Patent [19]
Fox

[11] Patent Number: 6,109,292
[45] Date of Patent: Aug. 29, 2000

[54] METHOD AND APPARATUS FOR REMOVING AND REPLACING THE TAMPERPROOF DEVICE FOR A FIRE HYDRANT OR OTHER VALVE DEVICE

[76] Inventor: Peter M. Fox, 959 E. Caribbean Dr., Summerland Key, Fla. 33042

[21] Appl. No.: 09/378,137

[22] Filed: Aug. 20, 1999

[51] Int. Cl.[7] .......................... F16K 35/00; F16K 35/06; F16K 43/00; E03B 9/06
[52] U.S. Cl. .............................. 137/296; 29/221.6; 81/27; 81/125.1; 81/176.1; 220/284; 220/724; 251/291; 251/292
[58] Field of Search ................ 29/213.1, 221.6; 72/705; 81/125.1, 176.1, 176.15, 461, 463, 27; 137/15.02, 15.18, 315.41, 272, 283, 284, 296; 220/284, 724, 725, 726, 727; 251/291, 292

[56] References Cited

U.S. PATENT DOCUMENTS

| | | |
|---|---|---|
| 2,649,825 | 8/1953 | Fisher ........................................ 29/213.1 |
| 3,364,554 | 1/1968 | Mueller et al. ......................... 29/213.1 |
| 3,568,657 | 3/1971 | Gue .............................................. 81/27 |
| 3,935,713 | 2/1976 | Olson ...................................... 29/221.6 |
| 4,423,721 | 1/1984 | Otte et al. ..................................... 81/27 |
| 4,785,692 | 11/1988 | Holmes ....................................... 81/27 |
| 5,012,566 | 5/1991 | Getz, Jr. ................................. 29/221.6 |
| 5,329,802 | 7/1994 | Nunez ....................................... 72/705 |
| 5,669,404 | 9/1997 | Guillermo ............................... 29/221.6 |
| 5,915,741 | 6/1999 | Parker ..................................... 29/221.6 |

*Primary Examiner*—George L. Walton

[57] ABSTRACT

A method and system for installing, removing and actuation a rotatable keyed actuation portion or lower valve stem portion of a fire hydrant or other valve device consisting of a first device for installing a rotatable keyed actuation portion, a second device for removing a rotatable keyed actuation portion and a third device for actuating a rotatable keyed actuation portion or a lower valve stem portion of a fire hydrant or other valve device.

9 Claims, 7 Drawing Sheets

METHOD AND APPARATUS FOR REMOVING AND REPLACING THE TAMPERPROOF DEVICE FOR A FIRE HYDRANT OR OTHER VALVE DEVICE

BACKGROUND OF THE INVENTION

1. Field of the Invention

This application claims priority to U.S. patent application Ser. No. 09/200,776 filed Nov. 28, 1998, now U.S. Pat. No. 5,941,274.

2. Discussion of Background

In patent application Ser. No. 09/200,776 a removable rotatable-keyed actuating portion has been introduced. This roratable keyed actuation portion may need replacing from time to time, or immediate actuation of the lower valve stem of a fire hydrant or other valve device may be required.

SUMMARY OF INVENTION

Accordingly, one object of this invention is to provide a novel system and method for installing a removable rotatable-keyed actuation portion.

Another object of this invention is to provide a novel system and method for removing a rotatable-keyed actuation portion.

Another object of this invention is to provide a novel system and method for establishing a failsafe operation of a lower valve stem portion.

It is noted that one objective of the present invention is to establish a basic method and system for removing and replacing a rotatable keyed actuation portion and allowing access to the lower valve stem of a fire hydrant or other valve device.

The above and other objectives are achieved according to the present invention by providing a new and improved method for removing and replacing a rotatable keyed valve stem actuation portion.

Accordingly a second aspect of the present invention, is to remove the rotatable-keyed actuation portion to allow access to the lower valve stem portion being secured.

BRIEF DESCRIPTION OF THE DRAWINGS

A more complete appreciation of the invention and many of the intendant advantages thereof will be readily obtained as the same becomes better understood by reference to the following detailed descriptions when considered in conjunction with the accompanying drawings, wherein.

DESCRIPTION OF THE PREFERRED EMBODIMENTS

Figure 1:
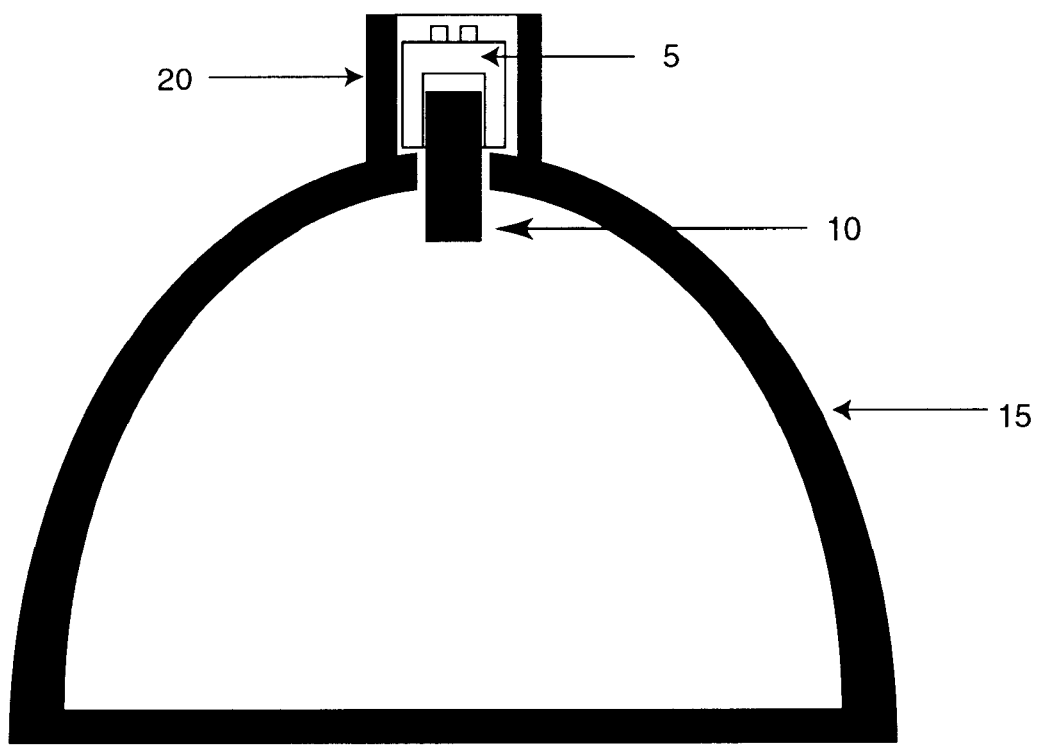
FIG. 1 illustrates a sectional view through a rotatable keyed valve stem actuation portion installed on a fire hydrant or other valve device.

Referring now to the drawings, wherein like reference numerals designate identical on corresponding parts throughout the several views, and more particularly to FIG. 1 thereof there is illustrated a standard valve system with a removable rotatable keyed valve stem actuating portion.

Referring to FIG. 1, a sectional view of the valve system is illustrated depicting a removable rotatable keyed valve stem actuation portion 5, an actuating valve stem portion 10, a hydrant or valve containment body 15, non-rotatable cover for the rotatable keyed valve stem actuating portion 20.

Figure 2:
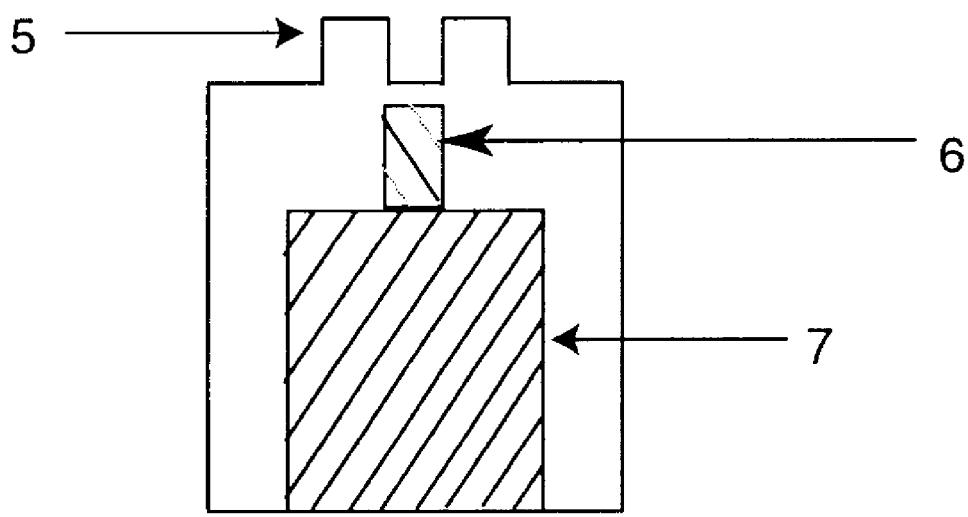
FIG. 2 illustrates a sectional view through rotatable-keyed valve stem actuation portion.
Figure 3:
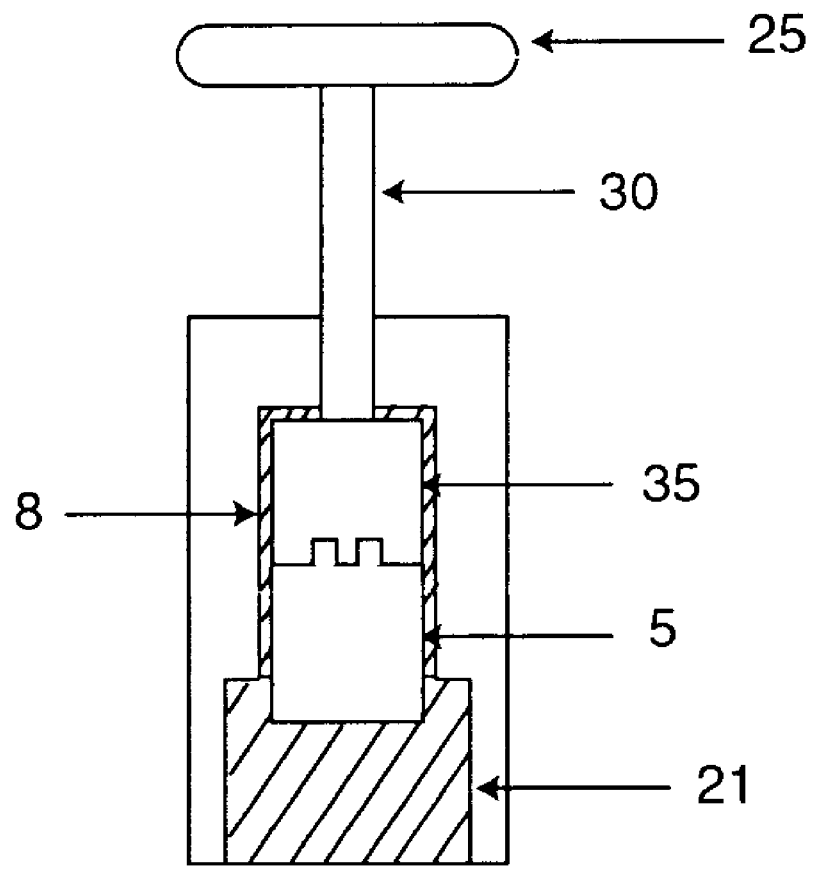
FIG. 3 illustrates a sectional view of an installation tool.
Figure 3A:
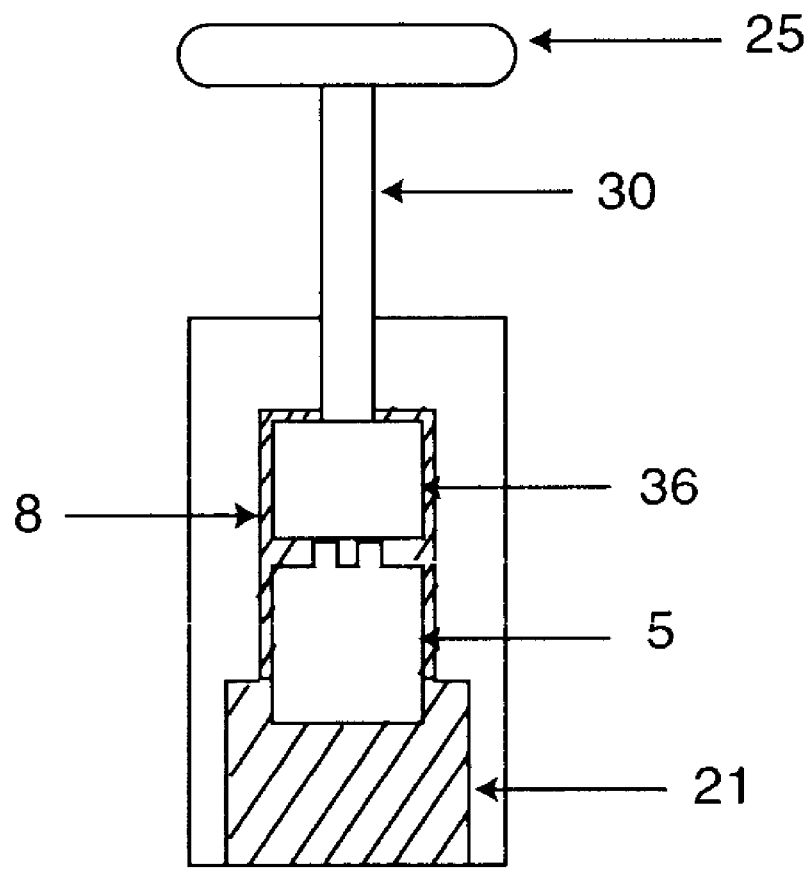
FIG. 3A illustrates a sectional view of an installation tool.

Referring to FIG. 2, a sectional view of the rotatable-keyed valve stem actuation portion 5, a tap ease recess 6, and a recess for a lower valve stem portion 7. Referring to FIG. 3, a sectional view of the installation tool indicating the rotatable keyed valve stem actuating portion 5 for installation, having a recess 8 for l receiving and aligning the rotatable keyed valve stem actuating portion 5 for installation, a recess 21 for receiving a non-rotatable cover 20 to aid in alignment, an insertion bar impact area 25, an insertion bar extension 30, and a reciprocating keyed insertion bar 35. Referring to FIG. 3A, a sectional view of the installation tool indicating the rotatable keyed valve stem actuating portion 5 for installation, having a recess 8 for receiving and aligning the rotatable keyed valve stem actuating portion 5 for installation, a recess 21 for receiving a non-rotatable cover 20 to aid in alignment, an insertion bar impact area 25, an insertion bar extension 30, and a flat insertion bar 36.

Figure 4:
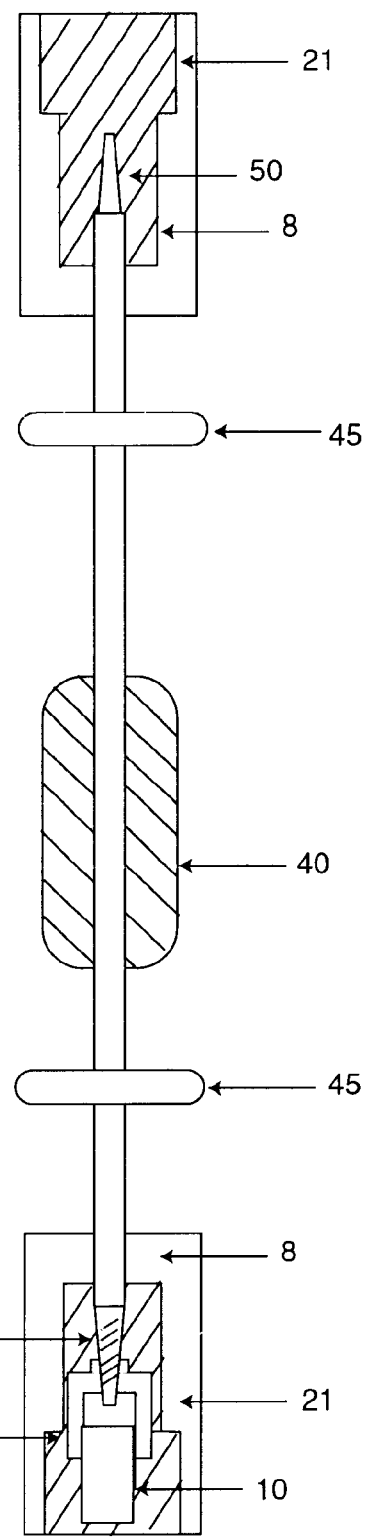
FIG. 4 illustrates a sectional view of an extraction tool.
Figure 4A:
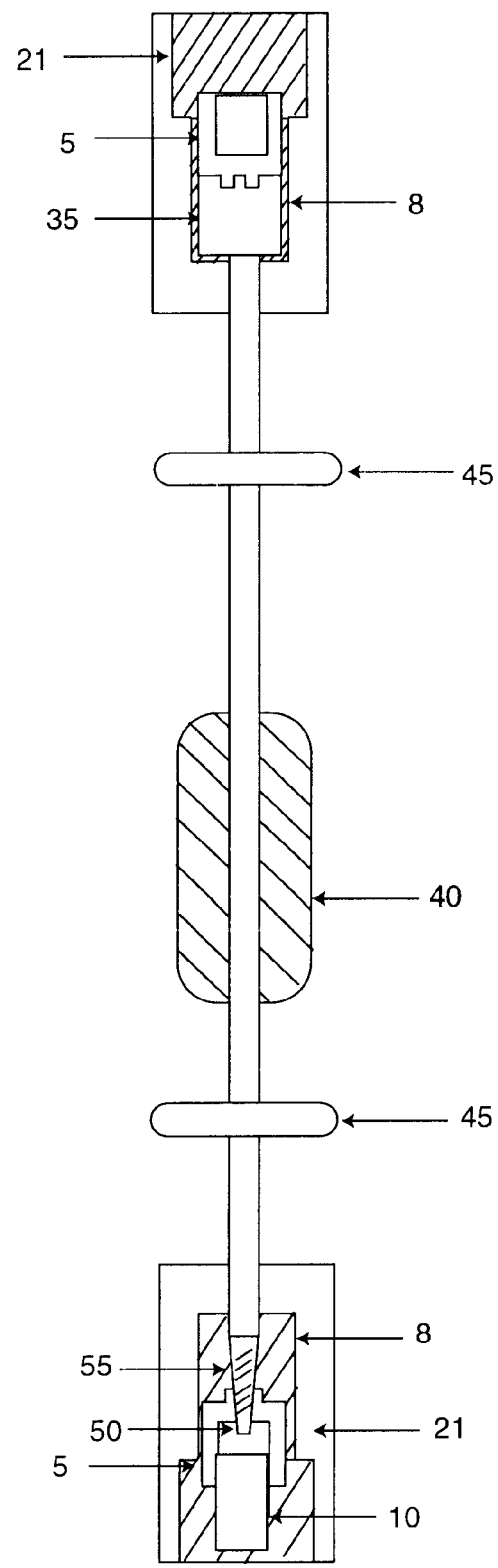
FIG. 4A illustrates a sectional view of an installation/removal combination tool.

Referring to FIG. 4, a sectional view of an extraction tool indicating the rotatable keyed valve stem actuating portion 5 for extraction and the actuating valve stem portion 10 having a recess 21 for receiving a non-rotatable cover 20 to aid in alignment, a movable impact weight 40, an extraction bar weight stop 45, an extraction punch 50 for penetrating the tap ease recess 6, a recess 8 for receiving the rotatable keyed valve stem actuating portion 5 being extracted, a recess 21 for receiving a non-rotatable cover 20 to aid in alignment, and a self tapping tip 55 for extracting rotatable keyed valve stem actuating portion 5. Referring to FIG. 4A, a sectional view of an extraction tool indicating the rotatable keyed valve stem actuating portion 5 for extraction and the actuating valve stem portion 10 having a recess 21 for receiving a non-rotatable cover 20 to aid in alignment, a movable impact weight 40, an extraction bar weight stop 45, an extraction punch point 50 for penetrating the tap ease recess 6, a recess 8 for receiving the rotatable keyed valve stem actuating portion 5 being installed, a recess 21 for receiving a non-rotatable cover 20 to aid in alignment, and a self tapping thread 55 for extracting rotatable keyed valve stem actuating portion 5.

Figure 5:
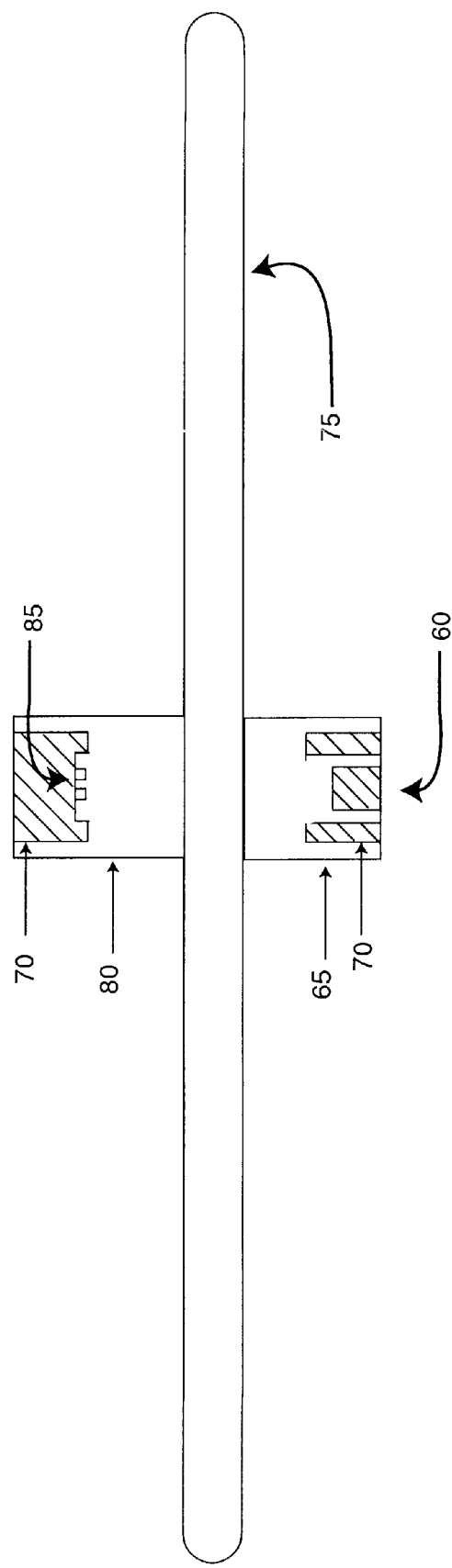
FIG. 5 illustrates a sectional view of a new valve stem wrench according to the present invention.

Referring to FIG. 5, a sectional view of a new valve stem wrench having a socked 65 with a reciprocating recess 60 for emergency actuation of the valve stem portion 10, having a recess 70 for receiving the non-rotatable cover 20 to aid in alignment, a leverage bar 75 to ease in rotating the actuation portion 10 or the keyed socket 80 having a recess 70 for receiving the non-rotatable cover 20 to aid in alignment, having a reciprocating key way 85 for actuating the rotatable keyed valve stem actuating portion 5.

Although the preferred embodiment of the present invention is described in terms of an impact and tap type device for extracting the rotatable keyed valve stem actuating portion, a simple drill and tap device could be utilized as would be apparent to those skilled in the art of mechanical engineering.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for removing a rotatable keyed actuation portion of a fire hydrant or other valve device which is surrounded by a non-rotatable protective cover and is substantially flush with the top portion of the rotatable keyed actuation portion and attached to a lower valve stem portion of the fire hydrant or other valve device, said removing device comprising:

a center shaft having reversible ends with a tapered punch guiding assembly at one end and a threaded actuating guiding assembly at the other ends either end being engaged by means of an with an inertial weight assembly to allow the weight to move in lineally opposite directions, a tapered punch guide assembly to fit over and around the non-rotatable protective cover for alignment of the tapered punch portion of the center shaft with the center of the rotatable keyed actuation portion, a tapered punch portion for penetrating a pre-centered and concave bottom portion of a rotatable keyed actuation portion to create a hole, a threaded actuating guide assembly to fit over and around the non-rotatable protective cover for alignment of the threaded actuator portion of the center shaft with the center of the rotatable keyed actuation portion, a threaded actuation portion to be inserted into the hole created by the tapered punch portion for engaging the rotatable keyed actuation portion by applying rotational force to the center shaft while applying inward force against the rotatable keyed actuation portion, an inertial weight assembly fitted over and around the center shaft with a free sliding weight confined by at least two weight stops at selected positions along said center shaft to act as impact points for forcing the tapered punch portion or the threaded actuation when the slidable weight is impacted against at least one of said weight stops to allow removal of the keyed actuation portion.

2. The removal device according to claim 1, wherein the tapered punch guiding assembly fits over and around the non-rotatable protective cover aligning the tapered punch portion with the precentered concave bottom portion of the rotatable keyed actuation portion, then sliding the inertial weight along the center shaft until it impacts with the weight stop forcing the tapered punch point to penetrate the precentered concave bottom portion of rotatable-keyed actuation portion, removing the device and reversing the center shaft to utilize the threaded actuation portion end, the non-rotatable protective cover is again engaged by the threaded actuating guide assembly aligning the threaded actuating portion with the punched portion of precentered concave bottom portion of the rotatable keyed actuation portion, then applying rotational force to the center shaft pressing inward against the punched portion of the rotatable keyed actuation portion, the threaded actuation portion is thereby engaged with the rotatable keyed actuation portion, then sliding the inertial weight along the center shaft until it impacts with at least one of the weight stop, and then the engaged threaded actuation portion and rotatable keyed actuation portion are disengaged from the non-rotatable protective cover and lower valve stem portion of the fire hydrant or other valve device.

3. The removal device according to claim 1, wherein the tapered punch guiding assembly can be combined with the threaded actuating guide assembly, thereby eliminating the need to disengage and reverse the center shaft for removal of the keyed actuation portion.

4. A device for installing a rotatable keyed actuation portion of a fire hydrant or other valve device which is surrounded by a non-rotatable protective cover and is substantially flush with the top portion of the rotatable keyed actuation portion and engaged with the lower valve stem portion of the fire hydrant or other valve device, said installing device comprising:

a guide portion to fit over and around the non-rotatable protective cover to align the rotatable keyed actuation portion with the non-rotatable protective cover and the lower valve stem portion, a center shaft with end portion surface reciprocating the keyed upper portion of the rotatable keyed actuation portion, and an opposite end portion acting as an impact point for engaging the keyed actuation portion with the non-rotatable protective cover and the lower valve stem portion by means of a driving force acting against the center shaft impact point for moving the center shaft in the direction of the valve device to allow installation of the keyed actuation portion.

5. The device for installing the rotatable-keyed actuation portion according to claim 4, wherein the center shaft is milled from a single material.

6. The device for installing the rotatable-keyed actuation portion according to claim 4, wherein the center shaft could have a flat end portion for aligning the rotatable keyed actuation portion with the lower valve stem portion.

7. The device according to at least one of claims 1, 2, 3, 4, or 6, wherein the devices are combined to form a single tool for removing and installing the keyed actuation portion.

8. A device for actuating a fire hydrant or other valve device wherein a non-rotatable protective cover has been installed having a top portion for engaging and actuating a rotatable keyed actuation portion which is substantially flush with the top portion of said non-rotatable protective cover by means of a rotational force, and having a bottom portion for engaging and actuating said lower valve stem portion which is below the top of said non-rotatable protective cover by means of a rotational force said actuation device comprising:

said top portion fitted over and around the non-rotatable protective cover having a reciprocating recess to engage and actuate the rotatable keyed actuation portion by means of a rotational force when the rotatable keyed actuation portion is substantially flush with the top of the non-rotatable protective cover, said bottom portion fitted over and around the non-rotatable protective cover having a reciprocating recess to engage and actuate the lower valve stem portion by means of a rotational force when the rotatable keyed actuation portion is removed, a body portion attached to the upper and lower portions to act as a lever for rotating the rotatable keyed actuation portion and the lower valve stem portion thereby actuating the valve device by means of rotating the keyed actuation portion or lower valve stem portion.

9. The actuation device according to claim 8, wherein the device can be utilized as an actuation key to rotate the rotatable keyed actuation portion or be reversed to be utilized to rotate and actuate the recessed lower valve stem portion of a fire hydrant or other valve device.

* * * * *